United States Patent [19]
Butera

[11] Patent Number: 5,305,400
[45] Date of Patent: Apr. 19, 1994

[54] METHOD OF ENCODING AND DECODING THE VIDEO DATA OF AN IMAGE SEQUENCE

[75] Inventor: Bill Butera, Emmendingen, Fed. Rep. of Germany

[73] Assignee: Deutsche ITT Industries GmbH, Freiburg, Fed. Rep. of Germany

[21] Appl. No.: 931,461

[22] Filed: Jul. 30, 1992

Related U.S. Application Data

[63] Continuation-in-part of Ser. No. 2,320, Dec. 5, 1991, abandoned.

[30] Foreign Application Priority Data

Dec. 5, 1990 [DE] Fed. Rep. of Germany ..... 90123317

[51] Int. Cl.$^5$ ............................................... G06K 9/36
[52] U.S. Cl. ........................................ 382/56; 382/48; 348/415
[58] Field of Search ................... 382/1, 48, 36, 56; 358/105, 108, 133, 136, 135, 426

[56] References Cited

U.S. PATENT DOCUMENTS

| | | | |
|---|---|---|---|
| 4,731,859 | 3/1988 | Holter et al. ...................... | 382/36 |
| 5,034,986 | 7/1991 | Karmann et al. .................. | 382/48 |
| 5,067,160 | 11/1991 | Omata et al. ..................... | 382/1 |
| 5,109,425 | 4/1992 | Lawton ............................. | 382/1 |
| 5,150,426 | 9/1992 | Banh et al. ....................... | 382/48 |
| 5,195,144 | 3/1993 | Le Parquier et al. ............. | 382/1 |

FOREIGN PATENT DOCUMENTS

| | | |
|---|---|---|
| 0379217 | 1/1990 | European Pat. Off. . |
| 0396360 | 4/1990 | European Pat. Off. . |
| 0154125 | 8/1990 | European Pat. Off. . |
| 3820038 | 12/1989 | Fed. Rep. of Germany . |

OTHER PUBLICATIONS

"Two–Dimensional Signal and Image Processing"; Jae S. Lim; Prentice-Hall International, Inc. Copyright 1990; pp. 568–581 and 622–641.

Primary Examiner—Joseph Mancuso
Attorney, Agent, or Firm—Thomas L. Peterson

[57] ABSTRACT

The video data of an image sequence are encoded and decoded section by section, with each nth key frame data field being transmitted as completely as possible. From two adjacent key frame data fields, n-1 phantom image data fields are calculated at the transmitting and receiving ends taking into account n-1 motion fields. Further, n-1 difference image data fields are determined at the transmitting end and transmitted together with the key frame data fields. At the receiving end, the original sequence of data fields is reconstructed from the transmitted data fields by recalculation of the motion fields.

14 Claims, 2 Drawing Sheets

METHOD OF ENCODING AND DECODING THE VIDEO DATA OF AN IMAGE SEQUENCE

CROSS REFERENCE TO RELATED APPLICATIONS

This application is a continuation in part (CIP) of International Application PCT/EP91/02320 filed Dec. 5, 1991 and designating inter alia the United States and abandoned.

BACKGROUND OF THE INVENTION

The present invention relates to a method of encoding and decoding the video data of an image sequence. Such methods commonly involve raster-scanning all images and subsequently digitizing the video signals thus obtained. In the simplest case, the image sequence is transmitted by transmitting the digitized video signals successively. This method of encoding requires a data channel of very high capacity, the needed capacity depending on resolution and frame rate. The same applies if the data of such image sequences have to be stored, in which case suitable memory capacity has to be made available for storing the data stream.

Encoding techniques are known which exploit redundancy which naturally occurs in the video data to reduce the volume of the data stream. In the case of single frames and image sequences, advantage is taken of the fact that the frame or image usually contains large-area structures besides find details, and that within these large-area structures, high resolution is not necessary. In large-area structures, adjacent picture elements in a horizontal, vertical or arbitrary direction differ only in the marginal areas of these structures. The similarity is even greater if two successive single frames of an image sequence are compared. Some conventional methods of encoding exploit these similarities, e.g., in differential pulse code modulation (DPCM).

Data reduction during encoding is also possible if, in addition to the pure video data of an image sequence, any motion within the image sequence is taken into account. This permits an estimation of the direction in which the respective picture elements are likely to move. From this transmitted motion information, better estimates can be determined at the receiving end for the single frames to be reconstructed. Conventional coding techniques for this purpose provide more or less accurately reconstructed image sequences depending on the method and amount of circuitry used. Such methods, including movement detection, are described, for example, in the Jae S. Lim, "Two-Dimensional Signal and Image Processing", Prentice-Hall International, Inc., 1990, particularly Chapter 9.6.2, "Motion-Compensated Image Restoration", pages 570–575.

European Patent Specifications EP-B 0 154 125 discloses a method for the motion-adaptive interpolation of television-picture sequences, an arrangement for carrying out the method, and a use of the method. There, individual parts of a picture sequence are omitted during transmission. By means of motion estimators it is determined which parts of the picture are stationary or moving and which stationary parts of the background are covered or made visible by the moving parts of the picture.

Since motion estimation for video signals is accomplished by means of complicated algorithms, which must be performed in real time, motion estimation for high-resolution television signals has so far been considered only at the transmitting end. The motion information is transmitted by the transmitter as a coded motion vector. At the receiver, the complete picture sequence for the high-resolution television picture is reconstructed from this motion information by means of simple adaptive filter circuits.

Advances in circuit integration as a result of digitization make it possible to use complex signal-processing techniques, which were hitherto employed only at the studio or transmitter end, in consumer equipment. For example, a further reduction of the video data to be transmitted can be obtained if the relatively large amount of motion information required to form the motion estimates at the receiving end need not be transmitted.

It is the object of the invention as claimed to provide a method of encoding and decoding video data of an image sequence which manages without the transmission of independent motion information and, nevertheless, ensures high-quality rendition.

BRIEF DESCRIPTION OF THE DRAWINGS

The invention and its advantages will now be explained in more detail with reference to the accompanying drawing, in which.

DETAILED DESCRIPTION OF THE INVENTION

The fundamental idea of the invention is to encode a group of single frames of the image sequence to be transmitted rather than each single frame of the sequence by the same method. If every nth image is transmitted, as completely as possible, as a "key frame", with n greater than/equal to 2, identical motion information can be determined from these key frames for arbitrary interim periods by identical motion estimations at the transmitting and receiving ends. With this motion information, the original intermediate frames can be reconstructed largely error-free, see, for example, FIG. 1, Line b, and FIG. 2, Line c.

Figure 1:
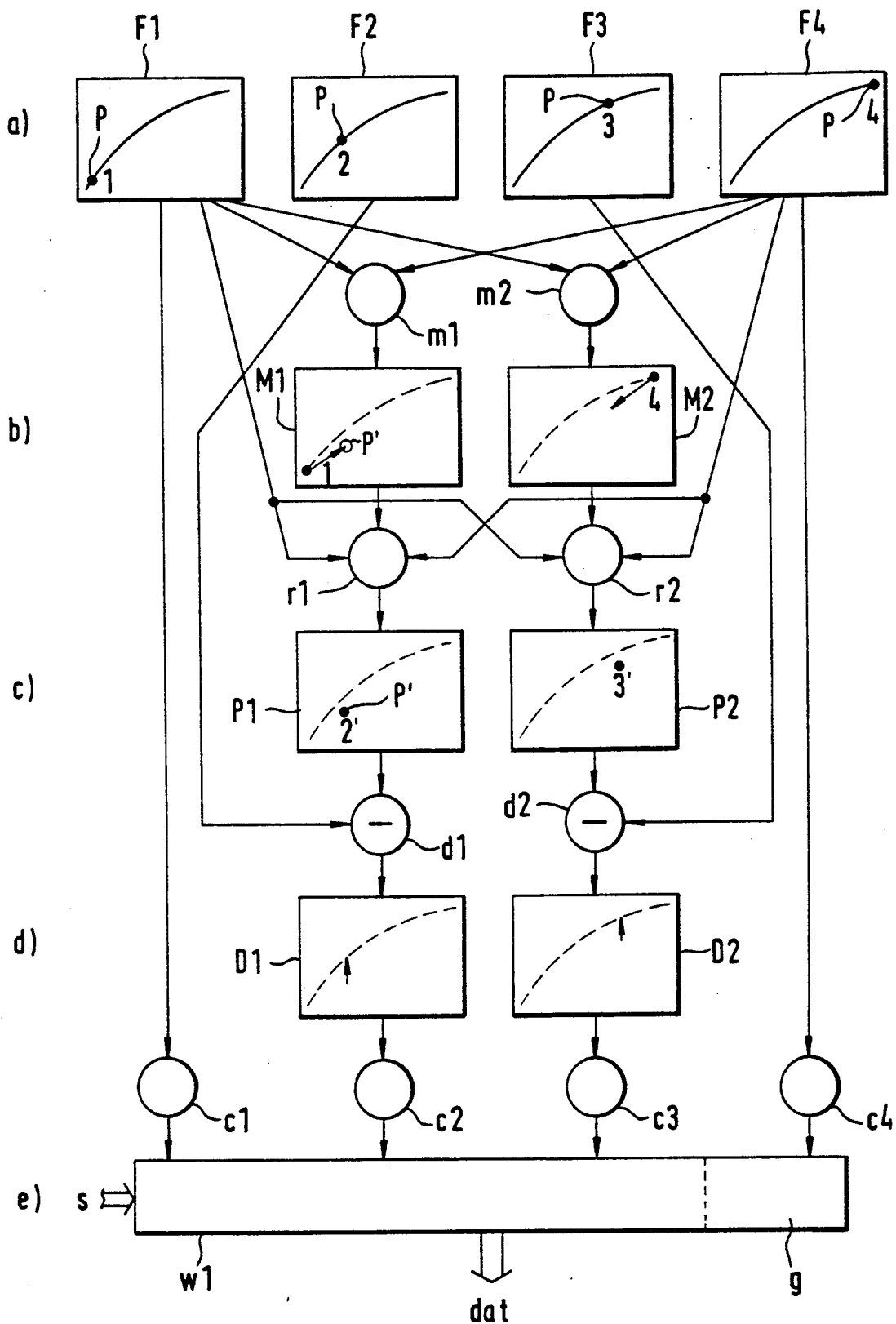
FIG. 1 is a block diagram of an embodiment of an encoder at the transmitting end.
Figure 2:
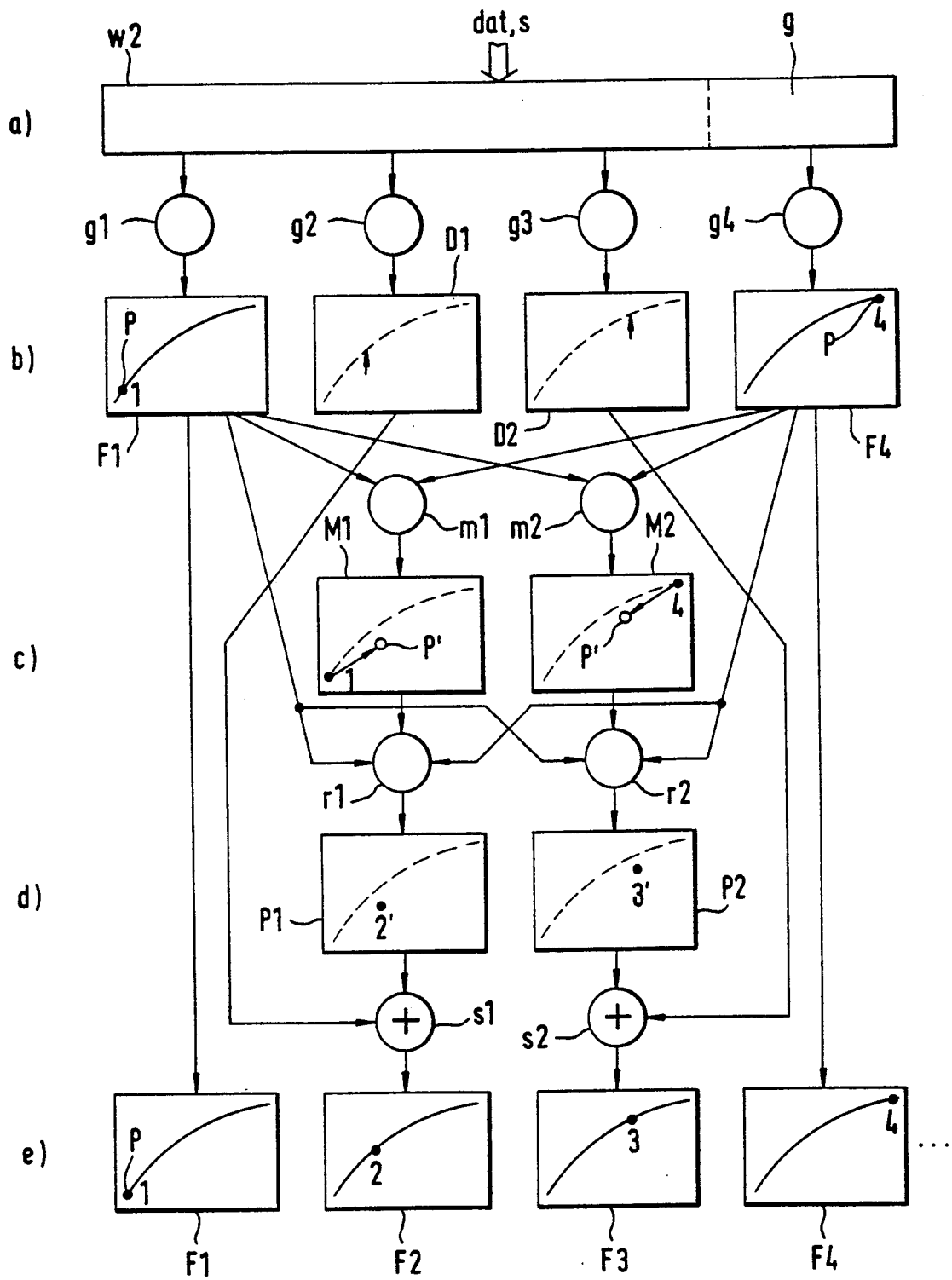
FIG. 2 is a block diagram of the associated decoder at the receiving end.

At the transmitting and receiving ends, identical phantom images can be determined for the interim periods by Linear interpolation of this motion information taking into account the moving areas, cf. FIG. 1, Line c, and FIG. 2, Line d. At the transmitting end, a difference image must be formed from the omitted intermediate frame and the associated phantom image, cf. FIG. 1, Line d. The information content of this difference image or these difference images is very low because of the great similarity to the associated intermediate frame—with suitable encoding, the data volume will thus become small as well. Therefore, the data stream to be transmitted, dat, cf. FIG. 1, Line e, is greatly reduced as compared to the original data stream of the image sequence. A very effective method of encoding and data reduction is described, for example, in the above-mentioned publication by Jae S. Lim in Chapter 10.3.4, pages 630-632. It is the subband-coding technique which used digital filter banks to encode the output data.

At the receiving end, the original image sequence is reconstructed via similar intermediate steps from the received difference images and the key frames, which are transmitted as completely as possible, cf. FIG. 2, Line e.

The individual functional units or signal-processing stages per se do not form part of the present invention. They are either known or use known algorithms. The same applies to the subsequently discussed motion estimators, with the aid of which the motion fields are determined. Motion estimators (m1, m2) can be implemented using, for example, L64720 video motion processors produced by LSI logic of Milpitas, Calif. or by STi 3220 motion estimation processor produced by SGS-Thompson of Italy. See, for example, the article entitled "Chip Set Broadens Options For Image Compression" in the Sep. 27, 1990 issue of *Electronic Design* at pages 151-154, which article is hereby incorporated herein by reference. This article discusses the LSI Logic processor and a related family of chips. The motion compensated interpolation performed by the subsequently discussed phantom-image-computing devices (r1, r2) can be implemented by, for example, the "Vision Processor" produced by Integrated Information Technologies of Santa Clara, Calif. or by the AVP-1400 D video decoder chip produced by AT&T or by the CL-990 chip produced by C-Cube. See the articles entitled "IIT Puts MPEG on a Chip" in *Electronic World News* and "Video codec chip set provides MPEG, P*64 and JPEG compliance" in the Apr. 23, 1992 issue of EDN, both of which articles are hereby incorporated herein by reference.

Turning now to FIG. 1, line a thereof shows schematically four successive frames of a moving image sequence. They correspond to first, second, third, and forth frame data fields F1, F2, F3, and F4, respectively. To illustrate movement, the schematic representation shows in each frame a circular arc with a snapshot of a uniformly moving pixel P. The pixel positions in the four frames are designated 1, 2, 3, and 4.

In the embodiment of FIG. 1 it is assumed that n=3. From the first and fourth frame data fields F1, F4, which are key frames, a first motion field M1 is formed by means of a first motion estimator m1. The reference time or instant of this motion field is related to the reference time or instant of the first intermediate-frame data field F2. In a similar fashion, a second motion field M2 is calculated for the reference time or instant of the second intermediate-frame data field f3 by means of a second motion estimator m2, cf. line b. In each of the two motion fields M1, M2, a motion vector has been drawn which points to the linearly interpolated location P' of the moving pixel. Strictly speaking the arrow should begin both in pixel position 1 and in pixel position 4 in both motion fields, M1, M2, in which case the respective weighting would be different, however. In FIG. 1 and FIG. 2, therefore, only the principal vectors are shown in the motion fields M1, M2.

From the first and second key frame data fields F1, F4, a first phantom image data field P1 and a second phantom image data field P2 are computed in a first and a second phantom-image-computing device r1, r2 by linear interpolation taking into account the motion fields M1 and M2, respectively. Each phantom-image-computing device is fed with the data of the first and second key frame data fields f1, f4 and the data of the respective motion field m1, m2.

By means of a first subtracter d1, a first difference image data field d1 is calculated from the first intermediate-frame data field f2 and the first phantom image data field P1, and by means of a second subtractor d2, a second difference image data field d2 is calculated from the second intermediate-frame data field f3 and the second phantom image data field P2. The two small arrows in the difference image data fields D1, D2 show schematically the position difference between the linearly interpolated pixel P' and the true pixel P when the associated intermediate-frame data field F2, F3 is compared with the associate phantom image data field P1, P2. Beyond this, the entire remaining image area contains no image information. With suitable coding, therefore, the data volume of the difference image data fields D1, D2 will be extremely small, because only a very small area contains image information, namely the deviation from the linear interpolation. With higher circuit complexity, nonlinear interpolation can be employed, of course.

For transmission, the selected image data of lines a and d are retrieved individually by means of a transmitter switching device w1, and converted into the data stream to be transmitted, dat, cf. line e. The section g of the transmitter switching device is to indicate that the second key frame data field F4 actually belongs to a new image-sequence section and would take the place of the first key frame data field F1 therein. Section g of the receiver switching device W2 in FIG. 2 is to be understood similarly. Before being combined in the transmitter switching device w1, the individual data fields may be reduced in data volume by means of first, second, third, and fourth auxiliary encoders c1, c2, c3, and c4, respectively, using conventional compressing techniques. In the transmitter switching device w1, the data stream dat is also provided with synchronizing characters s or synchronizing data which serve to separate and identify the individual data fields.

FIG. 2 shows schematically the method of decoding used at the receiving end. As most of the functional units are already known from FIG. 1, Like reference characters have been used to designate like functional units. The received data stream dat is first applied to a receiver switching device W2, shown in line a, which distributes the data stream dat to four memory devices in accordance with the synchronizing characters contained in the data stream. Via auxiliary decoders g1, g2, g3, g4, the data, which may have been reduced in the auxiliary encoders (c1-c4 of FIG. 1), can be restored to their original form. As a rule, each pixel of the stored data fields will be coded by itself, either as a combination signal via its quadrature components u, v or as separate component signals for the individual color cathodes.

Line b shows schematically that the memory device contains the data fields of the first and second key frames F1, F4 and the first and second difference images D1, D2. As in FIG. 1, a first motion field M1 and a second motion field M2 are determined via first and second motion estimators M1 and M2, respectively. A first phantom image data field P1 and a second phantom image data field P2, which correspond to a linearly interpolated intermediate frame, are computed from the motion fields M1 and M2, respectively, and the two key frame data fields F1, F4 by means of first and second phantom-image-computing devices r1, r2, respectively. The computation and the respective interpolation principle should, as far as possible, be identical to the methods used at the transmitting end; otherwise, image errors would result.

Unlike in FIG. 1, a sum image data field F2 is now calculated from the stored first difference image data field D1 and the first phantom image data field P1 by means of a first summing device s1. This is the desired reconstruction of the first intermediate-frame data field f2. The second intermediate-frame data field f3 is calculated analogously.

Line e shows schematically the reconstructed sequence of frame data fields f1, f2, f3, f4, which is thus available for further signal processing.

The method of decoding illustrated in FIG. 2, where n=3, reconstructs two adjacent intermediate frames F2, F3 for each section. The maximum number n (max)−1 of intermediate frames to be reconstructed depends on the motion and the resolution required. With a low motion content, the number of intermediate frames can be increased considerably.

It is, of course, irrelevant whether the methods of encoding and decoding described are implemented in hardware or software or in hardware and software. The increasing performance capability of video processors makes it possible to implement more an more functional units in the form of programs in real time with non-dedicated data-processing equipment. This is of particular interest in consumer electronics, because such universal microprocessors can be quickly adapted to different tasks by program modification.

Having described the invention with reference to a preferred embodiment thereof, modification may now suggest itself to those skilled in the art. The invention is not to be limited to the disclosed embodiment, except as required by the appended claims.

What is claimed is:

1. Method of encoding video data of an image sequence whose individual images follow each other at fixed time intervals, with each individual image having a frame data field associated therewith, said method comprising the steps of:
   (a) dividing the sequence of frame data fields into sections each comprising n frame data fields, with a first frame data field in each section serving as a key frame data field, and the remaining n-1 frame data fields in each section serving as intermediate-frame data fields, where n is greater than or equal to 2;
   (b) determining n-1 motion fields from the first key frame data field in a given section and from a second key frame data field in a next following second, by means of n-1 motion estimators, the respective reference times of said motion fields being equal to the reference times of the associated intermediate-frame data fields;
   (c) computing from the first and second key frame data fields and one of the motion fields, a respective phantom image data field by means of a respective phantom-image-computing device;
   (d) computing, from the phantom image data field and the associated intermediate-frame data field, difference image data by means of a subtractor; and
   (e) generating an output signal as a data stream formed from the data of the key frame data fields and the difference image data, said data being inserted into the data stream by means of a transmitter switching device which also inserts at least one synchronizing character for identifying and separating the individual data fields.

2. A method of decoding video data of an image sequence, said video data being contained in an encoded data stream, the method of decoding comprising the steps of:
   (a) separating, by means of a receiver switching device, a first key frame data field, a second key frame data field, and n-1 difference image data fields from said data stream including at least one synchronizing character, and feeding same to one memory device each, where n is greater than or equal to 2;
   (b) a determining, by means of n-1 motion estimators, n-1 motion fields from the first and second key frame data fields, the respective reference times of said motion fields being equal to the reference times of the associated difference image data fields;
   (c) a computing from one of the motion fields and the first and second key frame data fields, a respective phantom image data field by means of a respective phantom-imaged-computing device;
   (d) computing, from the phantom image data field and the associated difference image data field, an associated intermediate-frame data field by means of a summing device; and
   (e) forming an output signal of the first and second key frame data fields and the n-1 reconstructed intermediate-frame data fields.

3. Video data compression apparatus comprising:
   (a) means for dividing a sequence of video frame data fields into sections each comprising N frame data fields, with a selected frame data field in each section serving as a key frame data field, and the remaining N-1 frame data fields in each section serving as intermediate frame data fields, where N is an integer greater than one;
   (b) motion estimator means for determining N-1 motion fields from a first key frame data field in a given section and a second key frame data field in a following section, said N-1 motion fields having reference times corresponding to reference times of said intermediate frame data fields;
   (c) means responsive to said first and second key frame data fields and to said N-1 motion fields for generating N-1 phantom-image data fields, each phantom-image data field corresponding to a given motion field;
   (d) a subtractor responsive to said N-1 phantom-image data fields and to said N-1 intermediate frame data fields for generating N-1 difference image data fields, each difference image data field corresponding in its reference time to that of the phantom-image data field and the intermediate frame data field from which it was generated; and
   (e) means for generating an output data stream formed of data corresponding to the key frame data fields and the difference image data fields.

4. The video data compression apparatus of claim 3, wherein said means for generating an output data stream inserts synchronizing data into said stream.

5. The video data compression apparatus of claim 3, wherein said motion estimator means linearly interpolates N-1 motion fields based upon the first key frame data field in said given section and the second key frame data field in said following section.

6. Video data decompression apparatus for generating frames of video data from a compressed data format, said apparatus comprising:
   (a) means for separating incoming data in said compressed data format into a sequence of sections of data, each section including a key frame data field and N-1 difference image data fields, where N is an integer greater than one;

(b) motion estimator means for determining N-1 motion fields from a first key frame data field in a given section and a second key frame data field in a following section, said N-1 motion fields having reference times corresponding to reference times of said difference image data fields;

(c) means responsive to said first and second key frame data fields and to said N-1 motion fields for generating N-1 phantom-image data fields, each phantom-image data field corresponding to a given motion field;

(d) summing means responsive to said N-1 phantom-image data fields and to said N-1 difference image data fields for generating N-1 intermediate frame image data fields, each intermediate frame image data field corresponding in its reference time to that of the phantom-image data field and the difference image data field from which it was generated; and (e) means for generating an output data stream formed of a sequence of sections of data, each section having N data fields comprising the key frame data field for that section and the N-1 intermediate image data fields for that section.

7. The video data decompression apparatus of claim 6, wherein said means for separating incoming data in said compressed data format is responsive to synchronizing data in said incoming data.

8. The video data compression apparatus of claim 6, wherein said motion estimator means linearly interpolates N-1 motion fields based upon the first key frame data field in said given section and the second key frame data field in said following section.

9. A method of compressing video data comprising the steps of:

(a) dividing a sequence of video frame data fields into sections each comprising N frame data fields, with a selected frame data field in each section serving as a key frame data field, and the remaining N-1 frame data fields in each section serving as intermediate frame data fields, where N is an integer greater than one;

(b) determining N-1 motion fields from a first key frame data field in a given section and a second key frame data field in the following section, said N-1 motion fields having reference times corresponding to reference times of said intermediate frame data fields;

(c) generating, in response to said first and second key frame data fields and to said N-1 motion fields, N-1 phantom-image data fields, each phantom-image data field corresponding to a given motion field;

(d) subtracting said N-1 phantom-image data fields and said N-1 intermediate frame data fields to generate N-1 difference image data fields, each difference image data field corresponding in its reference time to that of the phantom-image data field and the intermediate frame data field from which it was generated; and (e) generating an output data stream formed of data corresponding to the key frame data fields and the difference image data fields.

10. The video data compression method of claim 9, wherein the step of generating an output data stream includes inserting synchronizing data into said stream.

11. The video data compression method of claim 9, wherein the step of determining N-1 motion fields linearly interpolates the N-1 motion fields based upon the first key frame data field in said given section and the second key frame data field in said following section.

12. A method for recovering video data from a compressed data format, said method comprising the steps of:

(a) separating incoming data in said compressed data format into a sequence of sections of data, each section including a key frame data field and N-1 difference image data fields, where N is an integer greater than one;

(b) determining N-1 motion fields from a first key frame data field in a given section and a second key frame data field in a following section, said N-1 motion fields having reference times corresponding to reference times of said difference image data fields;

(c) generating, in response to said first and second key frame data fields and to said N-1 motion fields, N-1 phantom-image data fields, each phantom-image data field corresponding to a given motion field;

(d) summing said N-1 phantom-image data fields and said N-1 difference image data fields to generate N-1 intermediate frame image data fields, each intermediate frame image data field corresponding in its reference time to that of the phantom-image data field and the difference image data field from which it was generated; and (e) generating an output data stream formed of a sequence of sections of data, each section having N data fields comprising the key frame data field for that section and the N-1 intermediate image data fields for that section.

13. The video data recovery method of claim 12, wherein the step of separating incoming data in said compressed data format responds to synchronizing data in the incoming data.

14. The video data recovery method of claim 12, wherein the step of determining N-1 motion fields linearly interpolates N-1 motion fields based upon the first key frame data field in the given section and the second key frame data field in the following section.

* * * * *